(12) United States Patent
Clinch et al.

(10) Patent No.: US 6,796,693 B2
(45) Date of Patent: Sep. 28, 2004

(54) 180-DEGREE ADJUSTER

(75) Inventors: James Patrick Clinch, Sterling Heights, MI (US); Karl Schmitt, Rockford, IL (US); Usman Yusuf Shami, Rockford, IL (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/351,722

(22) Filed: Jan. 27, 2003

(65) Prior Publication Data

US 2004/0145906 A1 Jul. 29, 2004

(51) Int. Cl.[7] .............................. F21V 17/02; F21V 7/00
(52) U.S. Cl. ...................... 362/512; 362/275; 362/515; 362/524; 362/514
(58) Field of Search ................................. 362/512, 273, 362/515, 524, 514

(56) References Cited

U.S. PATENT DOCUMENTS 5,193,905 A * 3/1993 Edwards et al. ............ 362/524
5,398,173 A * 3/1995 Ellenberger ................. 362/524
6,017,136 A * 1/2000 Burton ....................... 362/273
6,338,567 B1 * 1/2002 Denley ....................... 362/515

* cited by examiner

Primary Examiner—Stephen Husar
Assistant Examiner—James W Cranson
(74) Attorney, Agent, or Firm—Trexler, Bushnell, Giangiorgi, Blackstone & Marr Ltd.

(57) ABSTRACT

A headlamp adjuster configured for engagement with a reflector of a headlamp assembly. The headlamp adjuster includes a U-shaped structure which is engaged with a screw and which is engageable with the reflector. The screw is prevented from translating substantially upon rotation, but the headlamp adjuster is configured such that rotation of the screw causes the U-shaped structure to translate thereby moving the reflector. The screw includes an externally threaded shaft portion which is threadably engaged with an internally threaded bore of the U-shaped structure. The U-shaped structure may be a single piece which is engaged with the screw and is engageable with the reflector, or may include a U-shaped member which is engaged with the screw and a slide member, where the slide member is engageable with the reflector.

19 Claims, 5 Drawing Sheets

180-DEGREE ADJUSTER

BACKGROUND

This invention generally relates to headlamp adjusters, and more specifically relates to a 180-degree headlamp adjuster which is relatively simple and inexpensive, and includes few parts.

Modern day headlamps for vehicles are engineered and designed to be aerodynamically efficient. In this regard, the headlamps are designed as sealed assemblies wherein the portion of the headlamp approximate the outer surface of the automobile is relatively stationary, and is aerodynamic. A headlamp assembly normally includes: a fixed housing, to which an outer headlamp lens is affixed; a movable reflector, which is mounted within the fixed housing; and a stationary headlamp bulb, which is positioned within the movable reflector. Typically, the movable reflector is mounted to the housing by a number of universal or ball-type pivots which are stationary, or fixed, on the housing. A first pivot point and adjuster mechanism or headlamp adjuster is generally disposed vertical of the fixed pivot, and a second pivot point and adjuster mechanism or headlamp adjuster is generally disposed horizontal of the fixed pivot. As such, the adjuster mechanisms or headlamp adjusters can be adjusted to pivot the movable reflector about the fixed pivot in the vertical and horizontal planes to change the position of the headlamp reflector and aim the headlamp beam.

The first and second pivot points, normally termed the vertical pivot and the horizontal pivot, are typically provided by mechanical adjuster mechanisms or headlamp adjusters which effect movement of the reflector in the horizontal and vertical planes. These adjuster mechanisms normally employ an adjuster screw, or other similar component, to effect linear movement. The adjuster mechanisms are typically mounted to the housing of the headlamp assembly and are typically operatively connected to the movable reflector by ball and socket type pivots, or the like, such that linear movement of the adjuster screw produces pivoting of the removable reflector in the horizontal and vertical planes. In this manner, the adjuster mechanisms can be used to adjust the aim of automobile headlamp beams. While the connection between the end of the adjusting screw and the movable component is a ball-and-socket connection to permit the components to pivot freely in the intended vertical or horizontal plane, the ball portion on the end of the screw normally employs a form of interconnection, such as diametrically-spaced "ears", which preclude rotation of the adjustment screw and allow only linear movement thereof.

Due to crowded engine compartments and the advantage of providing that a headlamp adjuster can be serviced (i.e., adjusted easily), a need arose for a 180-degree adjuster which provides that a headlamp can be adjusted from the front of a vehicle. Generally, such 180-degree adjusters have been cable driven or dual-geared mechanisms, and have been both complicated and expensive.

OBJECT AND SUMMARY

A general object of an embodiment of the present invention is to provide a 180-degree headlamp adjuster which is relatively simple and inexpensive, and includes few parts.

Briefly, and in accordance with the foregoing object, an embodiment of the present invention provides a headlamp adjuster configured for engagement with a reflector of a headlamp assembly. The headlamp adjuster includes a U-shaped structure which is engaged with a screw and which is engageable with the reflector. The screw is prevented from translating substantially upon rotation, but the headlamp adjuster is configured such that rotation of the screw causes the U-shaped structure to translate thereby moving the reflector. The screw includes an externally threaded shaft portion which is threadably engaged with an internally threaded bore in the U-shaped structure. The U-shaped structure may be a single piece which is engaged with the screw and is engageable with the reflector, or may include a U-shaped member which is engaged with the screw and with a slide member, where the slide member is engageable with the reflector.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
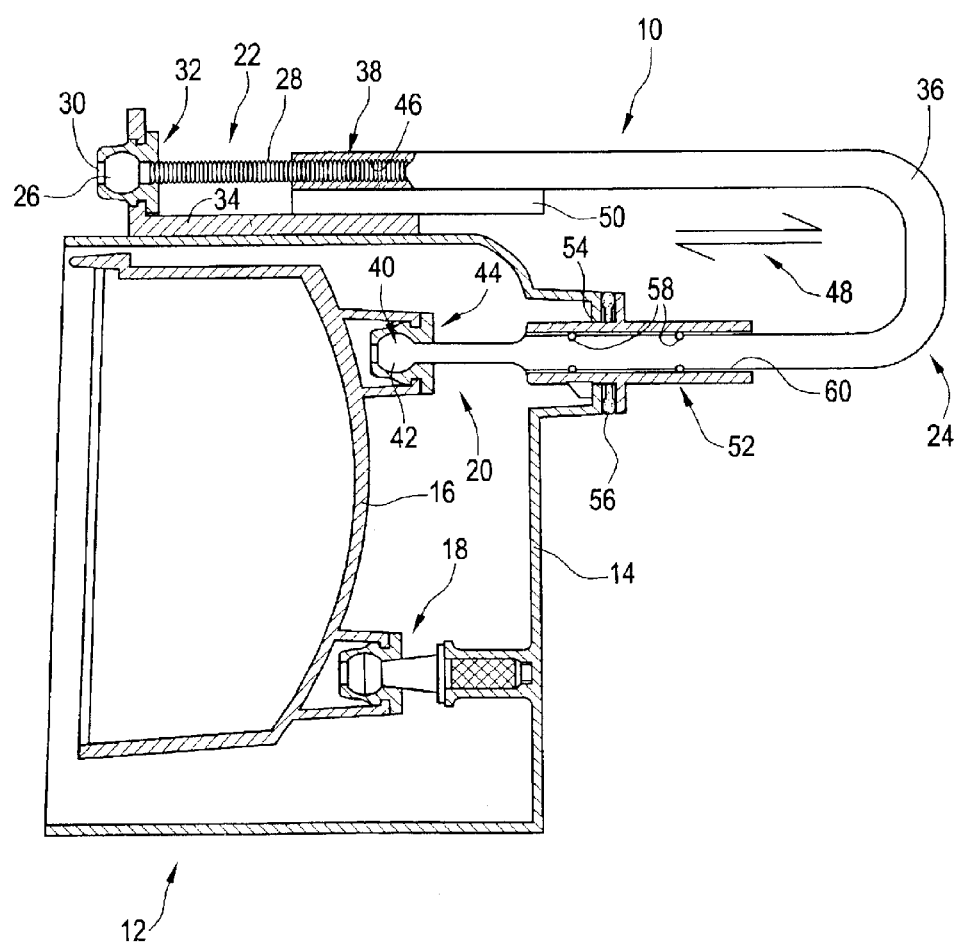
FIG. 1 is a partial, cross-sectional view of a headlamp adjuster which is in accordance with an embodiment of the present invention, showing the headlamp adjuster engaged with a reflector of a headlamp assembly.

While the present invention may be susceptible to embodiment in different forms, there are shown in the drawings, and herein will be described in detail, embodiments thereof with the understanding that the present description is to be considered an exemplification of the principles of the invention and is not intended to limit the invention to that as illustrated and described herein.

Figure 2:
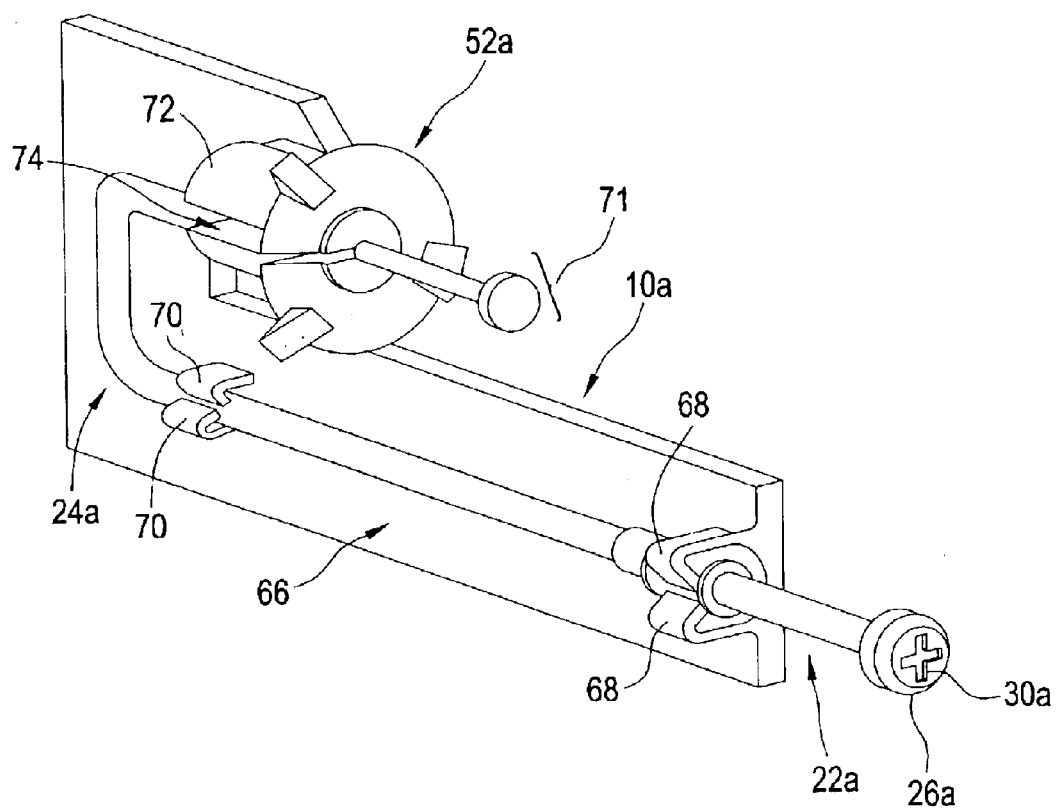
FIG. 2 is a perspective view of a headlamp adjuster which is in accordance with another embodiment of the present invention.
Figure 5:
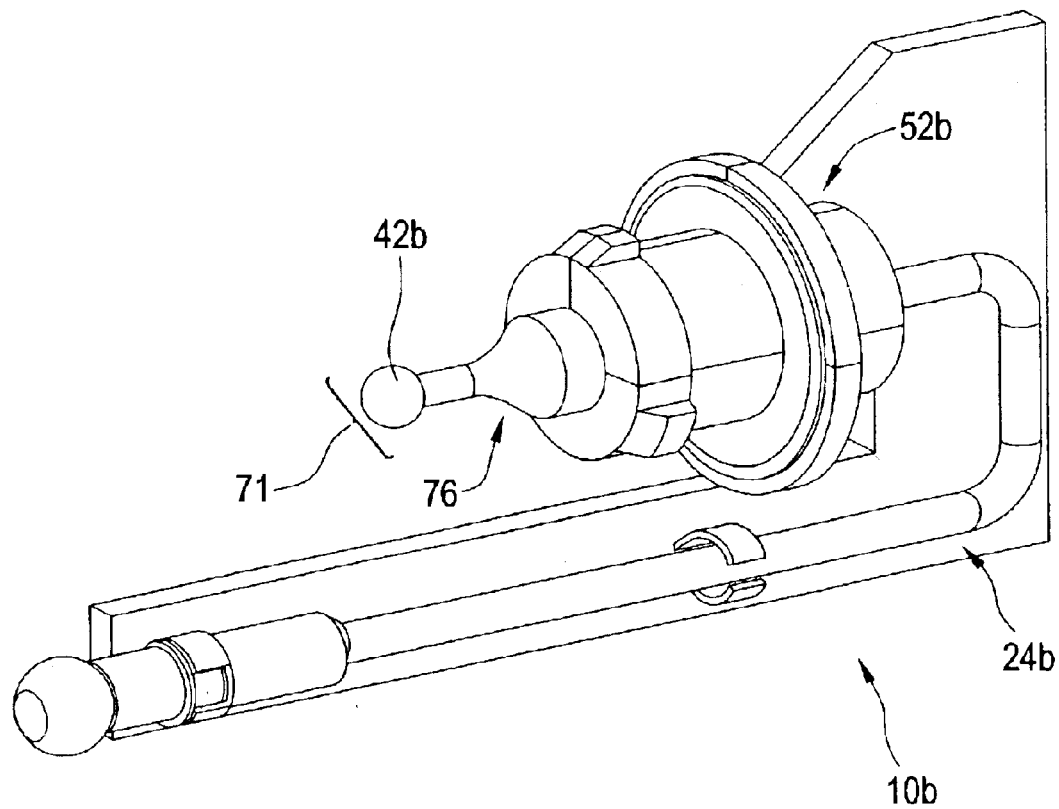
FIG. 5 is a perspective view of a headlamp adjuster which is in accordance with yet another embodiment of the present invention.

Several embodiments of the present invention are illustrated in the Figures. Specifically, FIG. 1 illustrates a headlamp adjuster 10 which is in accordance with a first embodiment, FIG. 2 illustrates a headlamp adjuster 10a which is in accordance with a second embodiment, and FIG. 5 illustrates a headlamp adjuster 10b which is in accordance with a third embodiment. Each of the headlamp adjusters 10, 10a, 10b is relatively simple and inexpensive, and includes few parts.

The headlamp adjuster 10 illustrated in FIG. 1 will be described first. Then, the other headlamp adjusters 10a, 10b will be described, focusing on the differences. Like reference numerals are used to identify like parts.

As shown in FIG. 1, the headlamp adjuster 10 is provided in association with a headlamp assembly 12 which includes a housing 14 and a reflector 16 in the housing 14. A fixed pivot 18 is provided between the reflector 16 and the housing 14, and the headlamp adjuster 10 is provided as a movable pivot 20 on the reflector 16, as either the horizontal pivot, the vertical pivot, or both (if two headlamp adjusters 10 are provided).

The headlamp adjuster 10 illustrated in FIG. 1 includes effectively two parts—a screw 22 and a U-shaped structure 24. As shown, preferably the screw 22 includes a ball end portion 26 and a shaft 28 extending from the ball end portion 24. The very end 30 of the ball end portion 26 preferably includes a profile configured for engagement with a screwdriver or some other tool for rotating the screw 22, thereby adjusting the position of the reflector 16 of the headlamp assembly 12. The shaft 28 has external threading thereon and the ball end portion 26 is preferably received in a ball socket 32.

As shown in FIG. 1, the ball socket 32 may be provided on a mounting bracket 34 which is affixed or mounted to the housing 14 of the headlamp assembly 12. The fact that the ball end 26 of the screw 22 is received in a ball socket 32 provides that when the screw 22 is rotated (i.e., to adjust the position of the reflector 16), the screw 22 rotates, but does not translate substantially axially (i.e., along its longitudinal axis). While FIG. 1 illustrates the ball socket 32 being provided on a mounting bracket 34 which is affixed or mounted to the housing 14, the ball joint may be provided on some other structure, or some other arrangement can be employed to provide that the screw 22 is generally restricted from translating substantially axially when rotated. Regardless, it is preferred that the screw 22 be prevented from translating upon rotation, and that the ball end portion 26 of the screw 22 and the reflector 16 of the headlamp assembly 12 point generally in the same direction, such that the ball end portion 26 of the screw 22 is accessible from the front of the vehicle.

As shown in FIG. 1, the U-shaped structure 24 of the headlamp adjuster 10 may be provided as a single piece, where the single piece includes a U-shaped portion 36 that provides a 180-degree bend and two ends—a first end 38 which is engaged with the screw 22, and a second end 40 which extends into the housing 14 of the headlamp assembly 12 and is engaged with the reflector 16. Specifically, the U-shaped structure 24 preferably includes a ball end 42 which is received in a ball socket 44 provided on the reflector 16, thereby providing a moveable pivot 20 for the reflector 16. With regard to the end 38 of the U-shaped structure 24 which is engaged with the screw 22, preferably end 38 of the U-shaped structure 24 provides a bore 46 and the bore 46 has internal threading therein and is threadably engaged with the external threading of the shaft portion 28 of the screw 22. The threadable engagement between the screw 22 and the U-shaped structure 24, and the fact that the screw 22 is prevented from translating substantially axially upon rotation of the screw 22, provides that rotation of the screw 22 causes the U-shaped structure 24 to translate one or way or the other depending on which direction the screw 22 is rotated. This rotation of the screw 22 and resulting translation of the U-shaped structure 24 in either direction is represented by arrows 48 in FIG. 1. As shown in FIG. 1, the mounting bracket 34 which carries the ball socket 32 may also provide support structure 50 for supporting the U-shaped structure 24.

As discussed, the U-shaped structure 24 extends into the housing 14 of the headlamp assembly 12 and is engaged with the reflector 16. More specifically, as shown in FIG. 1, the U-shaped structure 24 preferably extends through a slide housing 52 which is installed in en aperture 54 in the housing 14 of the headlamp assembly 12. The slide housing 52 may be configured for installation in a quarter-turn arrangement or some other arrangement, and a sealing member 56 may be provided between the slide housing 52 and the housing 14 of the headlamp assembly 12 to provide a seal therebetween so that moisture and other contaminants are prevented from entering the housing 14 through the aperture 54. Preferably, sealing/sliding members 58 are provided on the U-shaped structure 24, between an interior wall 60 of the slide housing 52 and the U-shaped structure 24, to provide additional seals and to facilitate a sliding arrangement between the U-shaped structure 24 and the slide housing 52.

In operation, the very end 30 of the ball end 26 of the screw 22 is interfaced by a tool to adjust the position of the reflector 16 of the headlamp assembly 12. The threadable engagement between the screw 22 and the U-shaped structure 24, and the fact that the screw 22 is prevented from translating substantially axially upon rotation of the screw 22, provides that rotation of the screw 22 causes the U-shaped structure 24 to translate one or way or the other depending on which direction the screw 22 is rotated. Translation of the U-shaped structure 24 causes the reflector 16 to move.

Figure 3:
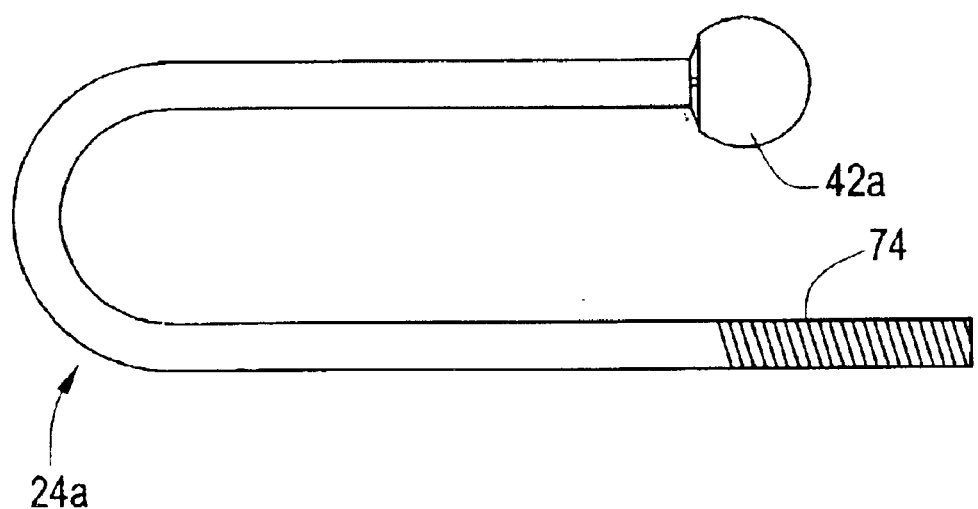
FIG. 3 is a side, elevational view of a U-shaped component of the headlamp adjuster shown in FIG. 2.
Figure 4:
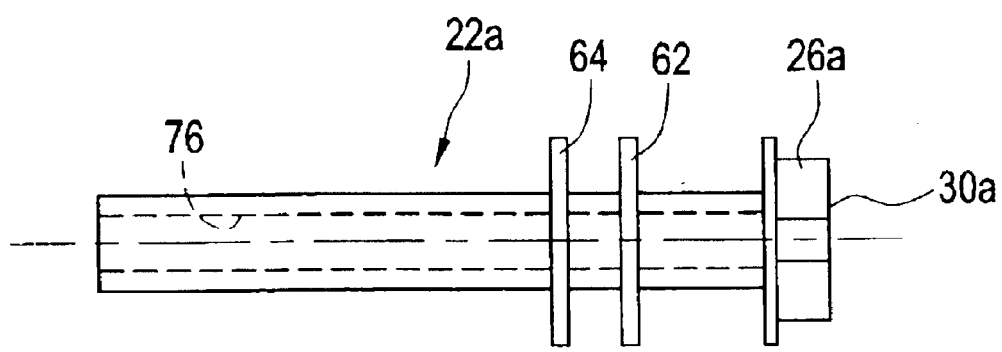
FIG. 4 is a side, elevational view of a screw component of the headlamp adjuster shown in FIG. 2.

FIG. 2 illustrates a headlamp adjuster 10a which is much like that shown in FIG. 1 in that the headlamp adjuster 10a includes a screw 22a and a single piece U-shaped structure 24a. The U-shaped structure 24a is shown isolated in FIG. 3, and the screw 22a is shown isolated in FIG. 4. As shown in FIGS. 2 and 4, instead of the screw 22a being secured in a ball socket, the screw 22a includes two shoulders 62, 64 and the screw 22a is retained by a mounting bracket 66. The mounting bracket 66 includes two clips 68 which engage an area of the screw 22a between the two shoulders 62, 64. As shown, the mounting bracket 66 also includes a pair of clips 70 which engage the U-shaped structure 24a. The U-shaped structure 24a includes a ball end portion 42a and extends through a mounting device or slide housing 52a which is preferably installed in an aperture 54 in the housing 14 of the headlamp assembly 12, like as shown in FIG. 1. Engagement of the ball end portion 42a with the reflector 16 is represented by circle 71 in FIG. 2. As shown in FIG. 2, the slide housing 52a of headlamp adjuster 10a may include a cylindrical portion 72 and a head portion 72 which installs in the aperture 54 in the housing 14, and a slot 74 may extend longitudinally along the side of the slide housing 52a to define an opening for receiving the U-shaped structure 24a. Much like the headlamp adjuster 10 shown in FIG. 1, the headlamp adjuster 10a shown in FIG. 2 provides that the U-shaped structure 24a is threadably engaged with the screw 22a viz-a-viz external threading 74 on the U-shaped structure 24a and corresponding internal threading 76 in the screw 22a. As shown in FIGS. 2 and 4, the screw 22a includes a end portion 26a. Preferably, the very end 30a of the end portion 26a includes a profile which facilitates engagement by a tool.

Figure 6:
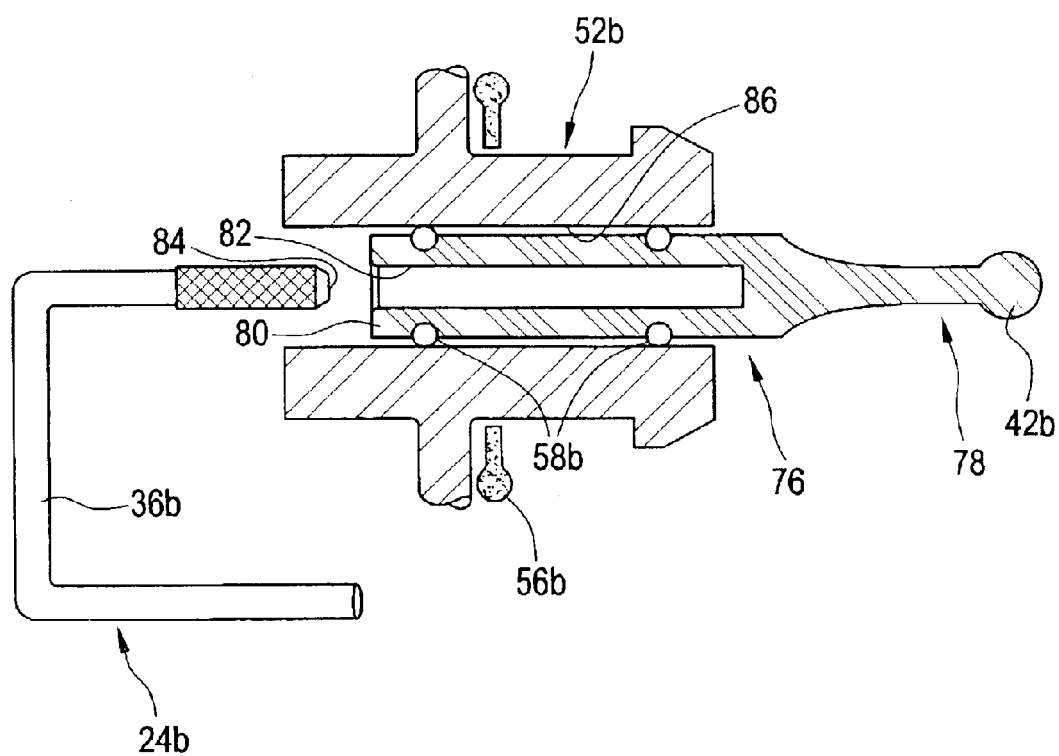
FIG. 6 is a cross-sectional view of slide housing and slide member components of the headlamp adjuster shown in FIG. 5, as well as a side view of an end portion of a U-shaped component of the headlamp adjuster shown in FIG. 5.

FIG. 5 illustrates a headlamp adjuster 10b which is much like that shown in FIG. 2, except the U-shaped structure 24b is not provided as a single piece and the slide housing 52b does not include a longitudinal slot along its side. Instead, as shown in FIG. 6, the U-shaped structure 24b provides that a U-shaped member 36b is engaged with a slide member 76 which is received in the slide housing 52b. One end 78 of the slide member 76 provides a ball end 42b which is received in a ball socket 44 on the headlamp reflector 16 (see FIG. 1). Engagement of the ball end portion 42b with the reflector 16 is represented by circle 71 in FIG. 5. The opposite end 80 of the slide member 76 includes an internal bore 82 which is configured to receive an end 84 of the U-shaped member 24b. Preferably, the end 84 of the U-shaped member 24b is knurled or otherwise configured for permanent attachment to the slide member 76, although alternate arrangements can be used.

As shown in FIGS. 5 and 6, preferably a sealing member 56b is provided for sealing between the slide housing 52b and the housing 14 of the headlamp assembly 12 (see FIG. 1), and the slide housing 52b is configured for installation in an aperture 54 in the housing 14, such as in a quarter-turn arrangement. As shown in FIG. 6, preferably additional sealing/sliding members 58b are provided on the slide member 76, disposed between an interior wall 86 of the slide housing 52b and the slide member 76, and the sealing/sliding members 58b provide additional seals as well as facilitate a sliding arrangement between the slide member 76 and the slide housing 52b.

While embodiments of the present invention are shown and described, it is envisioned that those skilled in the art may devise various modifications of the present invention without departing from the spirit and scope of the following claims.

What is claimed is:

1. A headlamp adjuster configured for engagement with a reflector of a headlamp assembly, said headlamp adjuster comprising: a U-shaped structure engageable with the reflector; a screw engaged with the U-shaped member, said headlamp adjuster configured such that said screw is prevented from translating substantially when said screw is related, and said headlamp adjuster being configured such that rotation of said screw causes said U-shaped structure to translate thereby moving the reflector.

2. A headlamp adjuster as recited in claim 1, wherein said screw includes a shaft portion having external threading and said U-shaped structure includes a bore having internal threading, said external threading on said shaft portion of said screw being threadably engaged with said internal threading in said bore of said U-shaped structure.

3. A headlamp adjuster as recited in claim 1, wherein said screw includes a bore having internal threading and said U-shaped structure includes external threading, said internal threading in said bore of said screw being threadably engaged with said external threading on said U-shaped structure.

4. A headlamp adjuster as recited in claim 1, wherein said U-shaped structure comprises a U-shaped member and a slide member, said U-shaped member being engaged with said slide member and said screw, said slide member being engageable with the reflector.

5. A headlamp adjuster as recited in claim 4, further comprising a slide housing, said slide member extending from said slide housing and being slidable relative thereto upon rotation of said screw.

6. A headlamp adjuster as recited in claim 5, further comprising at least one sealing member on said slide member, said at least one sealing member engaging an interior wall of said slide housing.

7. A headlamp adjuster as recited in claim 1, wherein said U-shaped structure comprises a single piece, said single piece being engaged with said screw and being engageable with the reflector.

8. A headlamp adjuster as recited in claim 7, wherein said screw includes a hall end, said ball end being engaged in a ball socket thereby preventing substantial translation of the screw upon the screw being rotated.

9. A headlamp adjuster as recited in claim 1, further comprising a mounting bracket, said screw being mounted to said mounting bracket such that said screw is generally prevented from translating substantially when rotated.

10. A headlamp adjuster as recited in claim 9, said U-shaped structure being mounted to said mounting bracket such that said U-shaped structure is allowed to translate when said screw is rotated.

11. A headlamp adjuster as recited in claim 9, further comprising a mounting device engaged with the U-shaped structure, said mounting device configured to mount to a housing of the headlamp assembly.

12. A headlamp adjuster as recited in claim 9, wherein said screw includes a pair of shoulders and said mounting bracket includes at least one mounting clip which engages the screw between the shoulders.

13. A headlamp adjuster as recited in claim 12, wherein said mounting bracket includes a pair of mounting clips which engage the screw between the shoulders.

14. A headlamp adjuster as recited in claim 10, wherein said mounting bracket includes at least one mounting clip which engages the U-shaped structure such that said U-shaped structure is allowed to translate when said screw is rotated.

15. A headlamp adjuster as recited in claim 11, wherein said mounting device includes a longitudinal slot configured to receive said U-shaped structure.

16. A headlamp adjuster as recited in claim 1, wherein said screw includes a shaft portion having external threading and said U-shaped structure includes a bore having internal threading, said external threading on said shaft portion of said screw being threadably engaged with said internal threading in said bore of said U-shaped structure, wherein said U-shaped structure comprises a single piece, said single piece being engaged with said screw and being engageable with the reflector.

17. A headlamp adjuster as recited in claim 16, further comprising a slide housing mountable to the headlamp assembly, said U-shaped structure extending through said sealing housing.

18. A headlamp adjuster as recited in claim 17, further comprising at least one sealing member on said U-shaped structure, said at least one sealing member engaging an interior wall of said slide housing.

19. A headlamp adjuster as recited in claim 16, wherein said screw includes a ball end, said ball end being engaged in a ball socket thereby preventing substantial translation of the screw upon the screw being rotated.

\* \* \* \* \*